(12) United States Patent
Cardoso et al.

(10) Patent No.: US 11,048,572 B2
(45) Date of Patent: Jun. 29, 2021

(54) SYSTEM AND METHOD FOR FAILURE MANAGEMENT USING DISTRIBUTED EXECUTION TRACES

(71) Applicant: Huawei Technologies Co., Ltd., Shenzhen (CN)

(72) Inventors: Jorge Cardoso, Munich (DE); Xing Zhu, Shenzhen (CN); Goetz Brasche, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 16/534,561

(22) Filed: Aug. 7, 2019

(65) Prior Publication Data

US 2019/0361766 A1 Nov. 28, 2019

Related U.S. Application Data

(63) Continuation of application No. PCT/EP2017/052780, filed on Feb. 8, 2017.

(51) Int. Cl.
*G06F 11/30* (2006.01)
*G06F 11/07* (2006.01)
*G06F 11/32* (2006.01)

(52) U.S. Cl.
CPC ...... *G06F 11/0778* (2013.01); *G06F 11/0709* (2013.01); *G06F 11/3006* (2013.01); *G06F 11/323* (2013.01)

(58) Field of Classification Search
CPC . G06F 11/0709; G06F 11/3006; G06F 11/323
(Continued)

(56) References Cited

U.S. PATENT DOCUMENTS 6,944,614 B1\* 9/2005 Ramasamy ............ G06F 16/21
8,910,124 B1\* 12/2014 Bhansali ............. G06F 11/3612
717/128
(Continued)

FOREIGN PATENT DOCUMENTS

| CN | 103605580 A | 2/2014 |
| CN | 105224445 A | 1/2016 |
| WO | 2014049804 A1 | 4/2014 |

OTHER PUBLICATIONS

Wang, H., et al., "Fault handling in distributed system," Institute of Aeronautical Computing Technique Research, Xi"an 710068, China, 2005, 7 pages.
(Continued)

*Primary Examiner* — Chae M Ko
(74) *Attorney, Agent, or Firm* — Conley Rose, P.C.

(57) ABSTRACT

A tracing system for managing failures of a service provided by a distributed system, the tracing system comprising a state machine store configured to store a distributed execution state machine (DESM), wherein states of the DESM correspond to predetermined milestones of the service and transitions of the DESM correspond to one or more instructions of the service; a logging unit configured to record events of the distributed system in a log store, wherein an event indicates a state and/or a transition of the DESM; a process reconstruction subsystem configured to reconstruct a trace of the DESM from the events stored in the log store; and a linking unit configured to link logging information of the distributed system to the states.

20 Claims, 10 Drawing Sheets

(58) Field of Classification Search
USPC .................................................. 714/38.1, 39
See application file for complete search history.

(56) References Cited

U.S. PATENT DOCUMENTS

| | | | |
|---|---|---|---|
| 9,069,668 | B2 | 6/2015 | Tak et al. |
| 9,135,145 | B2 | 9/2015 | Voccio et al. |
| 10,877,881 | B2* | 12/2020 | Wei .................... G06F 3/0608 |
| 10,880,405 | B2* | 12/2020 | Cooley .............. H04L 43/0817 |
| 2014/0215443 | A1 | 7/2014 | Voccio et al. |
| 2014/0304016 | A1* | 10/2014 | Bynum ............. G06Q 10/0631 705/7.12 |
| 2015/0106324 | A1* | 4/2015 | Puri ..................... G06F 11/079 706/52 |
| 2015/0169288 | A1 | 6/2015 | Yamamoto et al. |
| 2017/0010945 | A1* | 1/2017 | Attias .................. G06F 11/301 |
| 2020/0348995 | A1* | 11/2020 | Venkataraman ... G06Q 10/0635 |

OTHER PUBLICATIONS

Sigelman, B., et al., "Dapper, a Large-Scale Distributed Systems Tracing Infrastructure," Google Technical Report dapper-2010-1, Apr. 2010, 14 pages.

Fonseca R., et al., "X-Trace: A Pervasive Network Tracing Framework," the 4th USENIX Symposium on Networked Systems Design and Implementation (NSDI'07), Apr. 2007, 14 pages.

Barham, P., et al., "Magpie: online modelling and performance-aware systems," retrieved from https://www.usenix.org/legacy/publications/library/proceedings/hotos03/tech/full_papers/barham/barham_html/paper.html, Jun. 16, 2003, 14 pages.

Aalst, W., et al. "Process Mining: Discovery, Conformance and Enhancement of Business Processes," Springer, 2011, 2 pages.

"The Official Introduction to the ITIL Service Lifecycle," Published by TSO (The Stationery Office), 2007, 252 pages.

Weske, M., "Business Process Management," Concepts, Languages, Architectures, Springer, ACM Computing Classification, 1998, 372 pages.

Barham, P., et al., "Using Magpie for request extraction and workload modelling," USENIX Association, OSDI '04: 6th Symposium on Operating Systems Design and Implementation, 2004, 14 pages.

Lamport L., "Computation and State Machines," Apr. 19, 2008, 30 pages.

OpenStack Operations Guide: "Determining Which Component Is Broken," Jun. 28, 2018, 4 pages.

IEEE 1849-2016 XES Standard, "1849-2016—IEEE Standard for eXtensible Event Stream (XES) for Achieving Interoperability in Event Logs and Event Streams," Nov. 11, 2016, 2 pages.

Oliner, A., et al., "Advances and Challenges in Log Analysis," acmqueu, vol. 9, Issue 12, Dec. 20, 2011, 11 pages.

Avizienis, A., et al., "Fundamental Concepts of Dependability," Newcastle University, 2000, 21 pages.

Lamport, L., "Time, Clocks, and the Ordering of Events in a Distributed System," Communications of the ACM, vol. 21, Issue 7, Jul. 1978, 8 pages.

Foreign Communication From a Counterpart Application, PCT Application No. PCT/EP2017/052780, International Search Report dated Oct. 17, 2017, 5 pages.

Foreign Communication From a Counterpart Application, PCT Application No. PCT/EP2017/052780, Written Opinion dated Oct. 17, 2017, 10 pages.

Jian, Z., et al., "Information Security Technology (Second Edition)," May 31, 2015, University of Electronic Science and Technology Press, 3 pages.

\* cited by examiner

SYSTEM AND METHOD FOR FAILURE MANAGEMENT USING DISTRIBUTED EXECUTION TRACES

CROSS-REFERENCE TO RELATED APPLICATIONS

This application is a continuation of International Patent Application No. PCT/EP2017/052780, filed on Feb. 8, 2017, the disclosure of which is hereby incorporated by reference in its entirety.

TECHNICAL FIELD

The present disclosure relates to a tracing system and a method for managing failures of a service. The present disclosure also relates to a computer-readable storage medium storing program code, the program code comprising instructions for carrying out such a method.

BACKGROUND

Distributed systems are becoming increasingly complex, large, and heterogeneous. Examples of such large-scale distributed systems are public clouds, which can comprise thousands of distributed services running on platforms hosted on a variety of cloud-based infrastructures for which operators need to guarantee highly reliable services. Operating large-scale systems presents several challenges related to failure handling. Existing techniques to manage failures include debugging, profiling, and log analysis. While these approaches give valuable information about failures, they all provide a software components' perspective and overlook the underlying service provisioning.

Modern multi-tenant, consumer-oriented, large-scale service-oriented distributed systems, such as public cloud platforms (e.g., Open Telekom Cloud from Deutsche Telekom, Microsoft Azure, and Google App Engine) are increasingly becoming more complex, distributed over networks, and developed and operated by professionals with different sets of skills and knowledge. This setting makes the handling of failures extremely difficult. In small, self-contained environments it is simpler to handle failures since the conditions required to replicate failures are relatively straightforward. However, in complex systems with thousands of services and servers running concurrently, it is extremely difficult to manage failures including carrying root cause analysis and failure resolution, since environments cannot be easily replicated.

In such complex distributed systems, repairing the failures reported by customers cannot often be solely handled by developers or operators. Repair requires new troubleshooting methods and tools, which allow both roles to participate in the resolution. Therefore, several public cloud providers are using a DevOps paradigm to enable their development and operations teams and work together. DevOps increases the information exchanged and improves service levels throughout development, quality assurance, and operation.

While distributed systems have grown in size and complexity to levels not seen before, many engineers still rely on log facilities and use some kind of 'printf' instructions to record the status of their systems, anomalous conditions that happened, or to flag missing resources.

While log-based approaches are all useful techniques for software developers, their usefulness for operators is marginal. When a failure occurs, an error message written by a developer is returned to an operator. Nonetheless, in a cloud environment, an operator may not be able to understand the cause of the following error generated during service provisioning to create a new virtual machine requested by a user:

```
2016-09-19    20:26:33    6619    ERROR
nova.openstack.common.rpc.common [-] AMQP server on
localhost:5672 is unreachable: [Errno 111] ECONNREFUSED.
Trying again in 23 seconds.
```

Operations teams require a view on end-to-end service provisioning to quickly understand service failures. Operators want to understand the operational processes underlying service provisioning to effectively identify and localize failures. Developers want to understand the relationship between faults, errors, and failures on components to rapidly restore service availability. Thus, new solutions are required. In particular, there is a need for software failure management and software reliability. In particular, a goal can include increasing the reliability of distributed systems using root cause analysis, identify performance bottlenecks and bugs, detect anomalous behaviors during software execution, and repair failures.

SUMMARY

An object of the present disclosure is to provide a tracing system and a method for managing failures of a service, wherein the tracing system and the method for managing failures of a service overcome one or more of the above-mentioned problems with other approaches.

A first aspect of the embodiment of the disclosure provides a tracing system for managing failures of a service provided by a distributed system. The tracing system comprises:

a state machine store configured to store a distributed execution state machine (DESM) wherein states of the DESM correspond to predetermined milestones of the service and transitions of the DESM correspond to one or more instructions of the service; a logging unit configured to record events of the distributed system in a log store, wherein an event indicates a state and/or a transition of the DESM; a process reconstruction subsystem configured to reconstruct a trace of the DESM from the events stored in the log store; and a linking unit configured to link logging information of the distributed system to the states.

The distributed system can be, e.g. a cloud operating on a large number of servers, which are located at several data centers.

Storing a DESM can refer to storing information that describe possible states and transitions of the DESM. This information can then be used by the process reconstruction subsystem to reconstruct a trace.

The logging unit can provide an application programming interface (API) for the distributed system, including methods that can be invoked by the servers of the distributed system.

The linking unit is configured to link logging information of the distributed system to the states. The logging unit can be configured to log states and transitions, whereas the logging information that is linked by the linking unit can be logging information relating to failures, problems and/or unforeseen events. The states can relate to significant milestones, whereas the logging information can relate to details at the programmer level. The logging information can be traditional (not necessarily structured or standardized) logging information. The logging information can, for example, be obtained from one or more log files and/or log streams.

In some embodiments, the log store can also be referred to as event store. The event store can be configured to store a plurality of predefined events. The logging information on the other hand can be any kind of information.

The tracing system can be implemented as a service on the distributed system, e.g., operating on a server of the distributed system. In other embodiments, the tracing system is configured to operate on a server that is separate from the distributed system.

The process reconstruction subsystem can be configured to reconstruct the trace online, e.g., automatically while the distributed system is running. This has the advantage that reconstructed traces are readily available.

The tracing system of the first aspect enables significant improvements in the fields of failure localization, root cause analysis, and/or failure resolution. It achieves its objectives using distributed execution state machines and reconstructing distributed execution traces that service provisioning exhibit in response to user requests as the main abstraction for software code execution.

The tracing system also can make contributions in the fields of application performance monitoring (APM), real-time system monitoring, tracking and monitoring user transactions, and discovering and modeling components' interactions in distributed systems.

The tracing system of the first aspect can change the way software applications handle failures, and in particular large-scale distributed systems. The approach uses distributed execution state machines to describe and trace service provisioning. The distributed traces collected at runtime provide a state-based visualization of service provisioning to DevOps for an efficient and effective failure handling.

In a first implementation of the tracing system according to the first aspect, the events include: a service provisioning event indicating a start and/or end of service provisioning; a process event indicating an entry and/or an exit of a process; a state event indicating an entry and/or an exit of a state; a task event indicating an execution of a task belonging to a process; a control flow event indicating a decision affecting a control flow of a process; a correlation event indicating a correlation between a first and a second process; a concurrent execution event indicating a concurrent execution of processes; and/or a synchronization indicating a synchronization of processes.

Recording one or more of the above-mentioned events has the advantage that the trace provides a meaningful analysis of the operation of the distributed system.

In a second implementation of the tracing system according to the first aspect or the first implementation of the first aspect, a start state of the DESM corresponds to a user submitting a request to create a new virtual machine.

A distributed system may offer hundreds or thousands of services to users. A request for any of these services can be a start state of a DESM. However, a creation of a virtual machine can be a particularly important starting event and can be of particular relevance for analysis of the operation of the distributed system.

In a third implementation of the tracing system according to the first aspect or any of the preceding implementations of the first aspect, recording events comprises writing statements of an independent tracing language (ITL), wherein the ITL comprises lines indicating an identifier of a process, a process correlation and/or context metadata.

The ITL should be defined such that DESM traces can be automatically and deterministically reconstructed from ITL logs.

Preferably, the logging unit is implemented such that events from different servers and different services of the distributed system are recorded with statements of a unified ITL. This ITL may be standardized across systems.

In a fourth implementation of the tracing system according to the third implementation of the first aspect, the context metadata includes a debug message, a timestamp, a component or module identifier, a system metric, a method name, a file name, and/or a line number where processing is occurring.

This has the advantage that trace reconstruction based on the ITL is simplified.

In a fifth implementation of the tracing system, the ITL indicates a starting of a process with a start tag and/or the stopping of a process with a stop tag.

This has the advantage that the tags can easily be parsed, and thus start and stop of the process quickly be identified.

In a sixth implementation of the tracing system, all events generated by a first server of the distributed system in response to a request receive a same identifier. If the first server invokes a function of a second server, a correlation between a first process of the first server and a second process of the second server is indicated with a correlation statement of the ITL.

Including correlation statements in ITL logs has the advantage that during reconstruction of a DESM trace, the trace can be continued and also completed if a plurality of different servers (possibly even located in different data centers) are involved.

In a seventh implementation of the tracing system according to the first aspect or any of the preceding implementations of the first aspect, the logging information comprises time stamps. Additionally, the linking unit is configured to link logging information of the distributed system to the states of the DESM based on the time stamps.

Logging information can include, simple logging statements that were written with functions such as printf( ).

In an eighth implementation of the tracing system according to the first aspect or any of the preceding implementations of the first aspect, the log store comprises a message queue. A message queue provides a temporary message storage when a destination (e.g., a programming running on one of the servers) is busy or otherwise not available. Thus, message queue can make sure that no events are missing from the log store.

In a ninth implementation of the tracing system according to the first aspect or any of the preceding implementations of the first aspect, the distributed system comprises an instrumentation application programming interface (API), which is configured to, when a function of the instrumentation API is called, generate an event and transmit it to the message queue.

In a tenth implementation of the tracing system according to the first aspect as such or according to any of the preceding implementations of the first aspect, the DESM can be described by $(\Sigma, S, T, s, A, M, L, F)$, wherein $\Sigma$ is a set of tasks, wherein a task comprises one or more instructions, S is a set of states of the DESM, $s \in S$ is a start and end-state of the DESM, $T: s_c \times \Sigma \to s_n$ is a transition function of the DESM, $A \subseteq S$ is a set of accept states, $M: s_{sub} \to s_{sup}$ is a mapping function that assigns states $s_{sufb} \in S$ and transitions $t_{sub} \in T$ into superstates $s_{sup} \in S$, $L: s \to (st, sl)$ is a mapping function that assigns to a state s a state type $st \in \{$sequence, split, join$\}$ and a state logic $sl \in \{$ xor, or, and$\}$, and $F: t \to N$ is a mapping function that assigns to each transition t∈T a natural number to indicate an execution flow of transitions.

The DESMs can thus be seen as a subclass of hierarchical state machines. Experiments have shown that these are particularly suitable for describing traces of a service request in a distributed system.

In an eleventh implementation of the tracing system according to the first aspect or any of the preceding implementations of the first aspect, the tracing system further comprises a visualization subsystem configured to generate a graphical representation of the reconstructed trace of the DESM, wherein the graphical representation includes a tree view.

This has the advantage that, e.g., operators can quickly get an overview of where an error occurred.

A second aspect of the embodiment of the disclosure refers to a method for managing failures of a service provided by a distributed system. The method comprises: storing a distributed execution state machine (DESM), wherein states of the DESM correspond to predetermined milestones of the service and transitions of the DESM correspond to one or more instructions of the service; recording events of the distributed system in a log store, wherein an event indicates a state and/or a transition of the DESM; reconstructing a trace of the DESM from the events stored in the log store; and linking logging information of the distributed system to the states.

The methods according to the second aspect of the embodiment of e disclosure can be performed by the tracing system according to the first aspect of the embodiment of the disclosure. Further features or implementations of the method according to the second aspect of the embodiment of the disclosure can perform the functionality of the tracing system according to the first aspect of the embodiment of the disclosure and its different implementation forms.

In a first implementation of the method for managing failures of a service of the second aspect, recording events comprises writing statements of an independent tracing language (ITL), wherein the ITL comprises lines indicating an identifier of a process, a process correlation and/or context metadata.

A third aspect of the embodiment of the disclosure refers to a computer-readable storage medium storing program code, the program code comprising instructions for carrying out the method of the second aspect or one of the implementations of the second aspect.

BRIEF DESCRIPTION OF DRAWINGS

To illustrate the technical features of embodiments of the present disclosure more clearly, the accompanying drawings provided for describing the embodiments are introduced briefly in the following. The accompanying drawings in the following description are merely some embodiments of the present disclosure, modifications on these embodiments are possible without departing from the scope of the present disclosure as defined in the claims.

DESCRIPTION OF EMBODIMENTS

Figure 1:
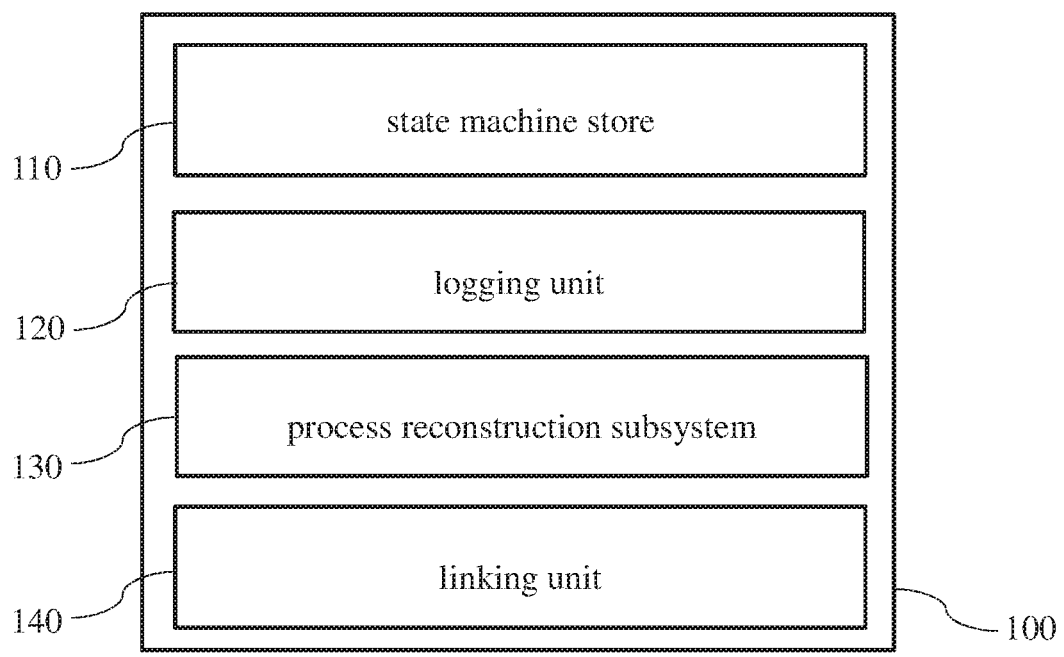
FIG. 1 is a block diagram illustrating a tracing system.

FIG. 1 shows a tracing system 100 for managing failures of a service provided by a distributed system. Herein, a distributed system can be a software system in which servers (e.g., computer programs that provide functionality for other programs) located on networked computers communicate by passing messages (e.g., using Hypertext Transfer Protocol (HTTP), remote procedure call (RPC)-like connectors, sockets, and message queues).

The tracing system comprises a state machine store 110, a logging unit 120, a process reconstruction subsystem 130, and a linking unit 140.

The state machine store 110 is configured to store a distributed execution state machine (DESM), wherein states of the DESM correspond to predetermined milestones of the service and transitions of the DESM correspond to one or more instructions of the service.

The logging unit 120 is configured to record events of the distributed system in a log store, wherein an event indicates a state and/or a transition of the DESM.

The process reconstruction subsystem 130 is configured to reconstruct a trace of the DESM from the events stored in the log store.

The linking unit 140 is configured to link logging information of the distributed system to the states.

Based on the trace obtained with the tracing system of FIG. 1, the following problems can be addressed. When service provisioning fails, how to identify in which state it failed? What is the effect of an error recorded in a log system on service provisioning? How can service provisioning failures be traced back to log errors and software code?

A service-oriented architecture (SOA) is an approach for connecting systems exposed as services. SOA systems are complex distributed systems in which the provision of a service to the end user requires communicating and interacting between multiple services. Each service provides a specific and valuable software function. End-users services can be invoked directly by end users. Service provisioning is the fulfillment of a service requested by an end user. It can be represented as a finite state machine, which identifies all the services involved and their logical/temporal dependencies during provisioning. Using OpenStack as an example, the services available to end users include 'virtual machine create' or 'volume delete'. The invocation of these services triggers their service provisioning, which in turn requests the execution of other services not visible to end users.

A system failure can be defined as "an event that occurs when the delivered service deviates from correct service". A failure refers to misbehavior that can be observed by the user. In particular, failures can occur at the server or service levels. When a server fails, for example, the service provided to the end user typically also fails.

Finite state machines (FSM) represent a computation model composed of states that define the state of a machine at a certain time, an input alphabet which is used to enable transitions to be triggered, and transitions—rules to determine the next state to go based on an input symbol. Formally, a FSM is a multi-tuple ($\Sigma$, S, T, s, A), where: ($\Sigma$) is the alphabet of symbols that are used by transition functions; (S) is the set of states representing the state machine; (s∈S) is the start state; (T:sc×$\Sigma$→sn) is a transition function which based on the current state (sc∈S) and an input symbol $\Sigma$, computes the next state (sn∈S); and (A⊆S) is the set of accept states.

Software programs, such as distributed systems, generate computations, and thus can be viewed as state machines. Finite state machines are widely used in both digital electronics and programming.

Hierarchical finite state machines (HFSM) are FSMs in which subsets of the states can be grouped into superstates with the following properties: all transitions of a superstate are applicable to its substates and one of the substates is defined as the entry substate. HFSM are extended to represent and capture the different states that a distributed system is in during service provisioning and to localize failures during service provisioning.

Existing mechanisms to handle failures in software systems are insufficient to handle failures in large-scale distributed systems such as cloud platforms. Existing approaches simply record debug, error, or warning messages specified by software developers using natural language into log files. While traditional logging—which is fundamentally the same as it was 35 years ago—can be effectively used with small, monolithic, centralized software programs, they are inappropriate to manage the service provisioning offered by large distributed systems due to their parallel, multi-tenant, heterogeneous, synchronous, and asynchronous nature.

The tracing system 100 of FIG. 1 externalizes the behavior of distributed systems using tracing technologies to monitor the states that are followed during end-to-end service provisioning. The term end-to-end service provisioning refers to the tracing of provisioning from the point where a service is requested to the system by an end user until a result is returned to the user. During provisioning tens (or even hundreds) of states may be reached and transitions followed.

Existing techniques to manage failures, including debugging, profiling, and log analysis, are all built on top of traditional logging mechanisms managed solely by software developers. The focus is on identifying the errors and failures that happen in software, libraries, and middleware. Even the more modern approaches, which use new instrumentation primitives to trace software execution, are oriented to track function calls. While developers find this information useful, for operations teams the information is too low-level and technical, and fails to capture the behavior of service provisioning.

The tracing system 100 tackles this problem using a higher abstraction level than traditional message logging. It uses an extension of the hierarchical finite state machine abstraction to monitor service provisioning progress and distributed tracing to localize failures.

Other approaches rely on low-level instrumentation primitives (e.g., 'log_event(string)', 'pushdown( )', and 'pushnext( )') to log isolated pieces of information describing the successful or failed execution of software instructions. The tracing system 100 uses a semantically richer form of tracing by borrowing theoretical contributions and technological developments from the fields of theory of computation, states machines, and distributed tracing to monitor service provisioning. This is a fundamental shift from an instruction view to an abstract state machine perspective to handle failures.

The tracing system 100 thus can provide a new approach to help operations and development teams to handle failures in SOA-oriented, large-scale distributed systems by tracing service provisioning at two layers of abstraction: a relatively "higher" abstract layer understandable to operations teams and a relatively "lower" concrete layer understandable to software developers. Each layer represents a different view of the same information, but uses different objects and compositions that apply only to a particular domain or stakeholder. The visibility given to DevOps via abstraction simplifies the complex task of failure management.

In preferred embodiments, the tracing system can comprise the following features:

Instrumentation using State Machine Semantics. To externalize traces, distributed systems need to use specific instrumentation APIs with state machine semantics to record the transitions triggered and the states followed during service provisioning.

Independent Tracing Language. To enable distributed execution traces to be accessed and analyzed by external tools, independent representation languages need to be adopted.

Tracing Linkage with Logs. To support DevOps, the developer view (Dev) and the operator view (Ops) need to be integrated. In other words, abstract state machines representing service provisioning need to be aligned and linked with traditional logging infrastructures.

In some embodiments, the tracing system 100 does not replace traditional logging infrastructures. Instead, it provides a state machine view on service provisioning using distributed execution state machines (DESM), an extension of hierarchical finite state machines, and establishes links from their states and transitions to existing logging records. This linking enables to quickly identify the root cause of failures and localize failures.

Figure 2:
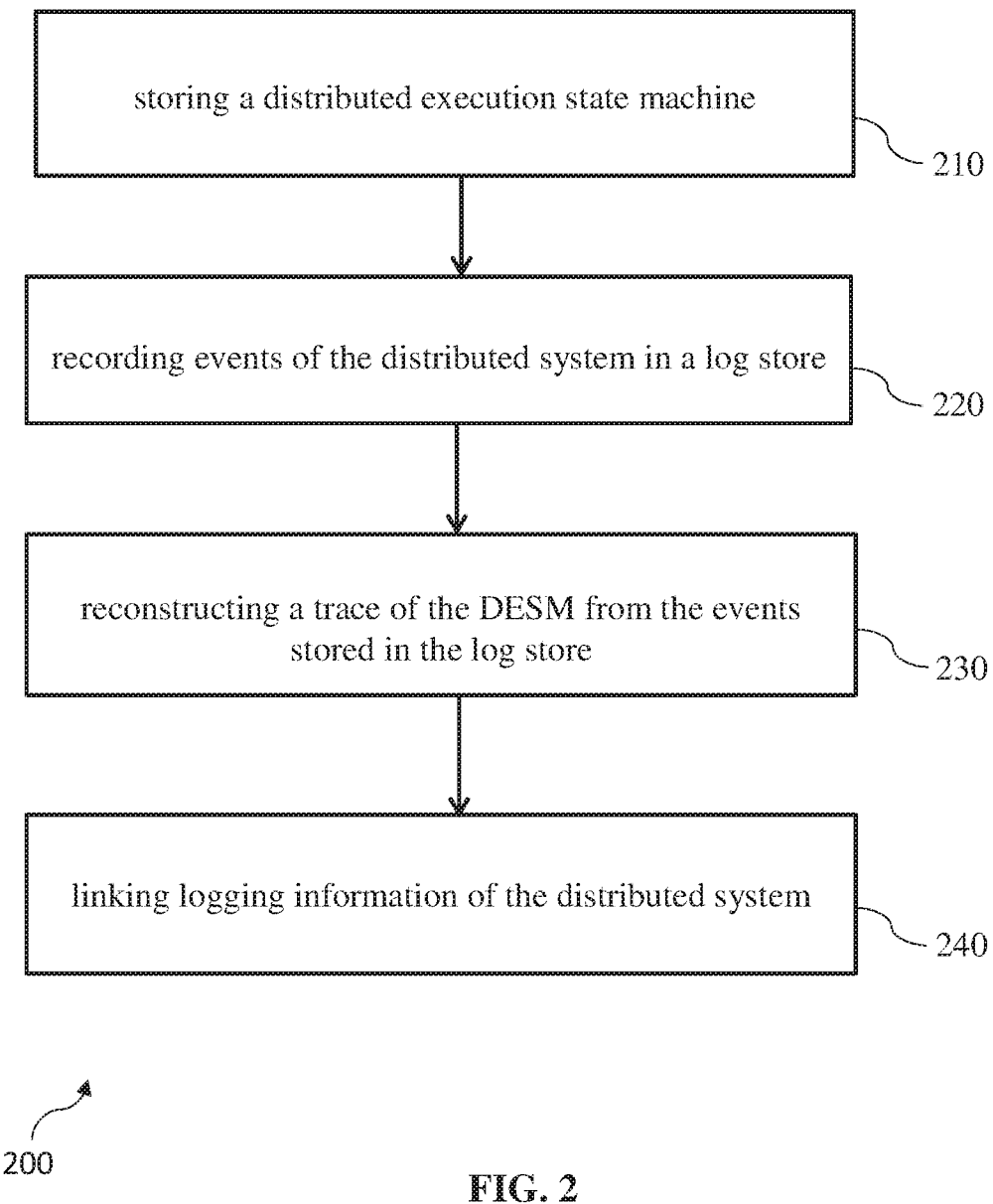
FIG. 2 is a flow chart of a method for managing failures of a service.

FIG. 2 shows a method 200 for managing failures of a service provided by a distributed system. The method 200 can be implemented, e.g., by the tracing system 100 of FIG. 1.

The method 200 comprises a first step 210 of storing a distributed execution state machine (DESM), wherein states of the DESM correspond to predetermined milestones of the service and transitions of the DESM correspond to one or more instructions of the service.

The method comprises a second step 220 of recording events of the distributed system in a log store, wherein an event indicates a state and/or a transition of the DESM.

The method comprises a third step 230 of reconstructing a trace of the DESM from the events stored in the log store.

The method comprises a fourth step 240 of linking logging information of the distributed system to the states.

Figure 3:
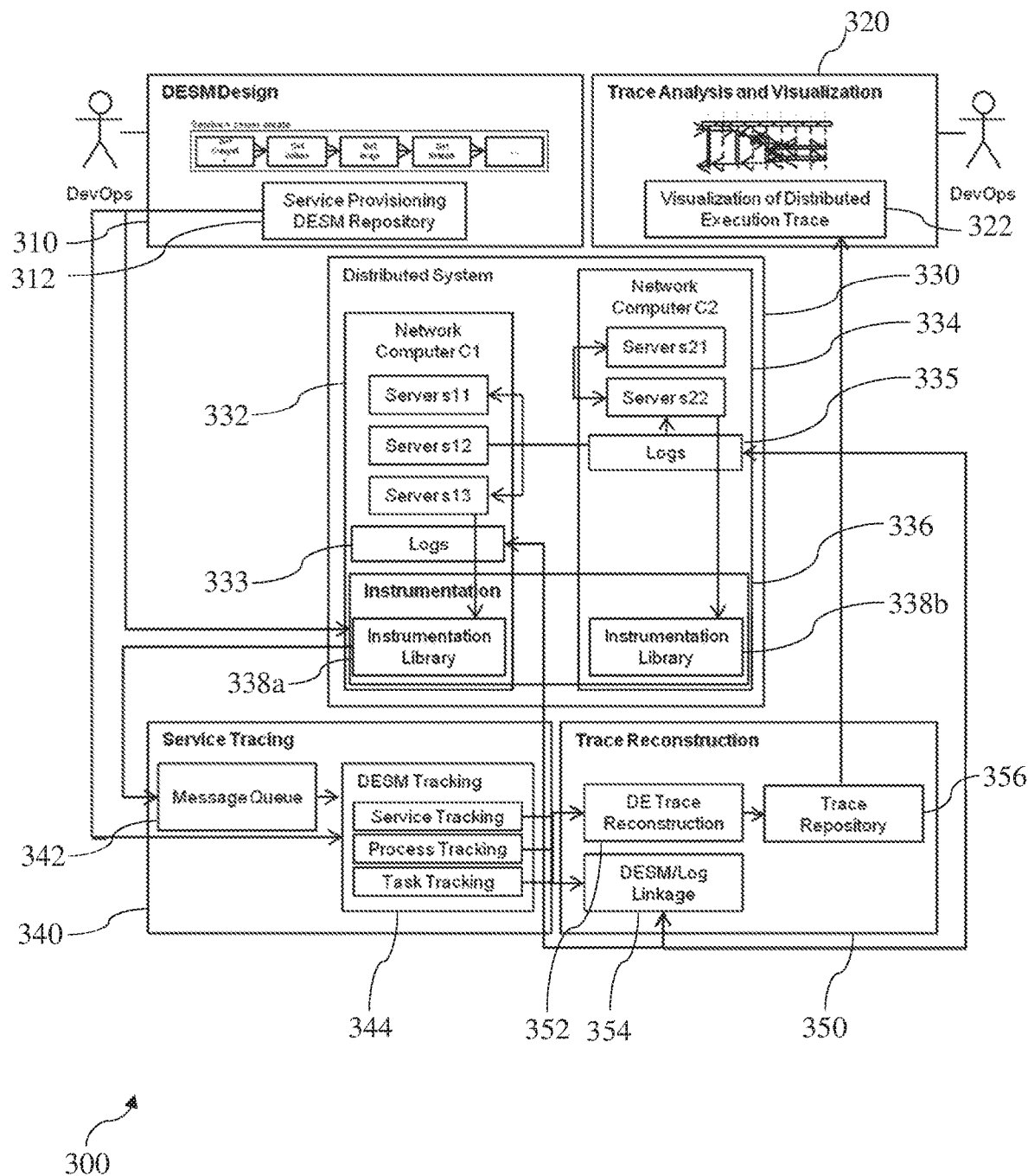
FIG. 3 is a block diagram of a distributed system comprising a system for managing failures of a service provided by the distributed system.

FIG. 3 is a block diagram of a system 300 comprising a tracing system for managing failures of a service provided by a distributed system 330. The distributed system comprises a first network computer 332 and a second network computer 334. The first network computer 332 has a first store for Logs 333 and the second network computer 334 has a second store for Logs 335.

The system for failure management comprises five subsystems illustrated in FIG. 3.

A DESM Design subsystem 310 enables the design of service provisioning models to capture the transitions triggered and the states reached by a distributed system in response to a service request. The DESM subsystem 310 comprises a Service Provisioning DESM Repository 312, which stores DESM models which have been created with the DESM Design subsystem 310.

An instrumentation subsystem 336 and a first and second Instrumentation Library 338a, 338b provide an API with DESM semantics to be used by the distributed system 330 to monitor and externalize their behavior. The first Instrumentation Library 338a is accessed by the first network computer 332 and the second Instrumentation Library 338b is accessed by the second network computer.

A service tracing subsystem 340 receives, stores, and indexes events from the Instrumentation subsystem 336 about the progress of service provisioning.

A trace reconstruction subsystem 350 reconstructs distributed execution traces from the tracing events indexed.

A trace analysis and visualization subsystem 320 transforms the reconstructed distributed execution traces into graphical representations, e.g. tree representations, which are suitable to be understood and analyzed by DevOps teams.

The subsystems and modules can interact in the following manner.

Developers and operators use the DESM design subsystem 310 to model service provisioning using distributed execution state machines to identify important milestones (states) which need to be externalized at runtime. The models are stored in the service provisioning DESM repository module 312 to enable sharing and reuse.

The instrumentation subsystem 336 and its instrumentation library modules 338a, 338b are used to instrument the distributed system to insert primitives into the software code to trace the start of services, the states followed, and the tasks executed during services provisioning. This is an instrumentation of type white box. The instrumentation library module 338a sends information to the service tracing subsystem 340 in the form of events. This can be achieved using a Message Queue 342, e.g., a fast queuing system, a database, a file or any other medium, which enables to share information.

The service tracing subsystem 340 and its DESM tracking module 344 have three important roles. They track the request of services made by end users. Each time a user requests a service, the Instrumentation Library 338a will capture this event and send it to the DESM Tracking module 344. The Process Tracking and Task Tracking modules have similar goals, but are used to track process and task events, respectively.

Once all of the provisioning events generated after a service request have been collected, the Trace Reconstruction subsystem 350 and its Distributed Execution Trace Reconstruction module 352 will store the events in a time-based database, and start the reconstruction of the end-to-end processes that were followed during service provisioning. Tasks will be associated with their respective processes, and processes will be associated with their respective services. For each event used to reconstruct service provisioning, the event will be linked (using temporal information) with records in the (traditional) Logs of the Distributed System 330. This linking, done by the DESM/Log Linkage module integrates the higher abstract layer for operations teams and the lower abstract layer for software developers. This linkage enables to achieve a round-trip monitoring and analysis of service provisioning. For example, from a log record indicating a failure, the linking established enables quickly identifying the state and transitions of service provisioning affected. It is also possible to quickly identify the root cause of a failure visible in a state or transition of service provisioning by inspecting the linked log records. The traces are stored in a Trace Repository module 356 for later analysis and visualization.

The Trace Analysis and Visualization subsystem 320 accesses and retrieves the traces from the Trace Repository 356 and uses several techniques and graphical languages to display the DESM underlying service provisioning. Operations and developers teams can visually handle and resolve failures.

Figure 4:
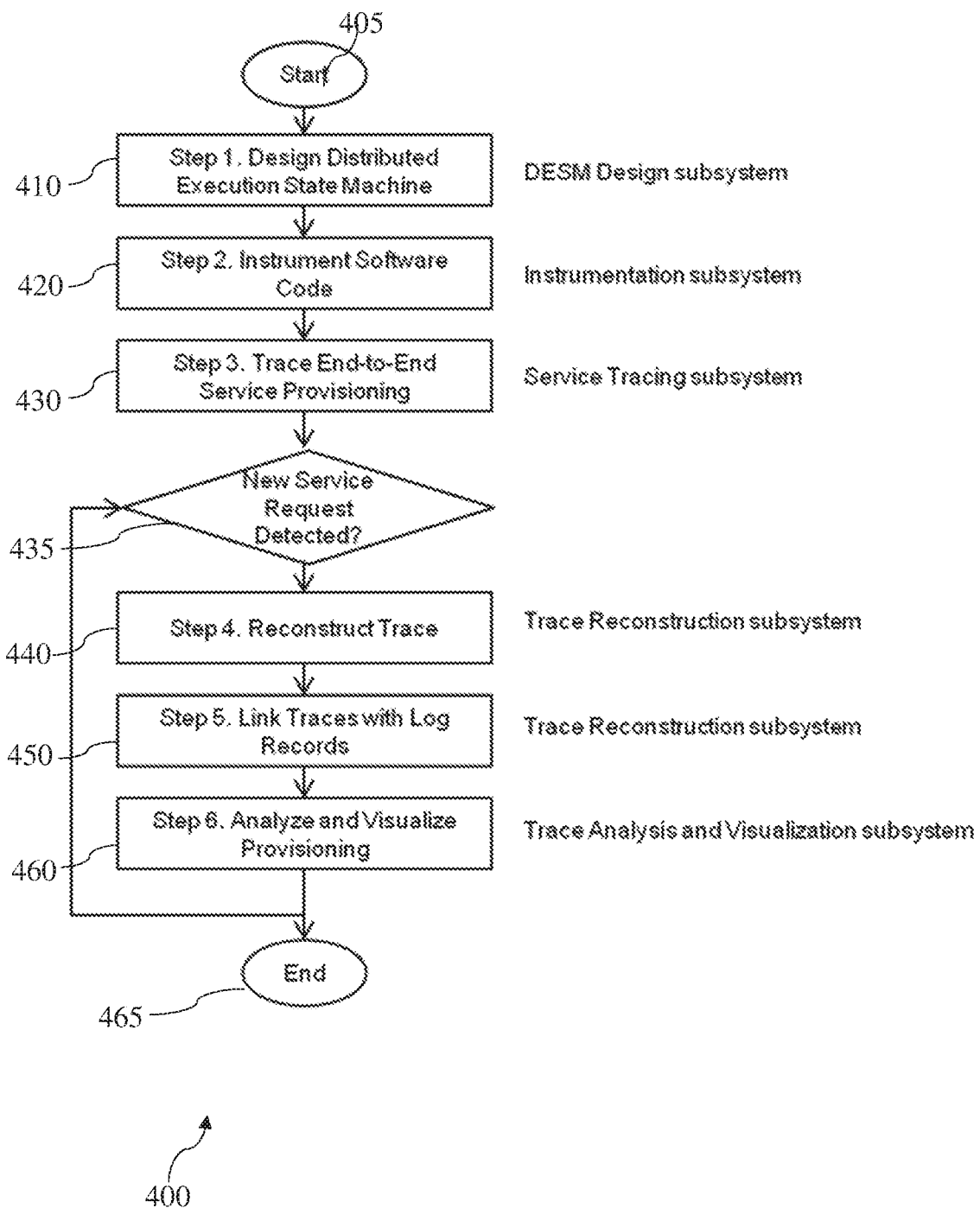
FIG. 4 is a flow chart of a method for managing failures.

FIG. 4 is a flow chart of a method 400 for managing failures.

The method 400 is initialized in an initial step 405. In a first step 410, the DESM is designed. Operations and development teams should both participate in design. Preferably, this step is carried out with a DESM Design subsystem that provides a graphical user interface.

In a second step 420, the instrumentation subsystem 336 is provided.

In a third step 430, end-to-end service provisioning is carried out.

When, in step 435, a new service request is detected, the method proceeds with a step 440 of reconstructing a trace.

Subsequently, in step 450, traces are linked with log records.

Then, in step 450, the linked traces are analysed and visualized. For example, the DESM can be visualized as a graph view and failures, as evident from the log records, can be visualized next to nodes or edges of the graph.

The method ends in a final step 465.

Figure 5:
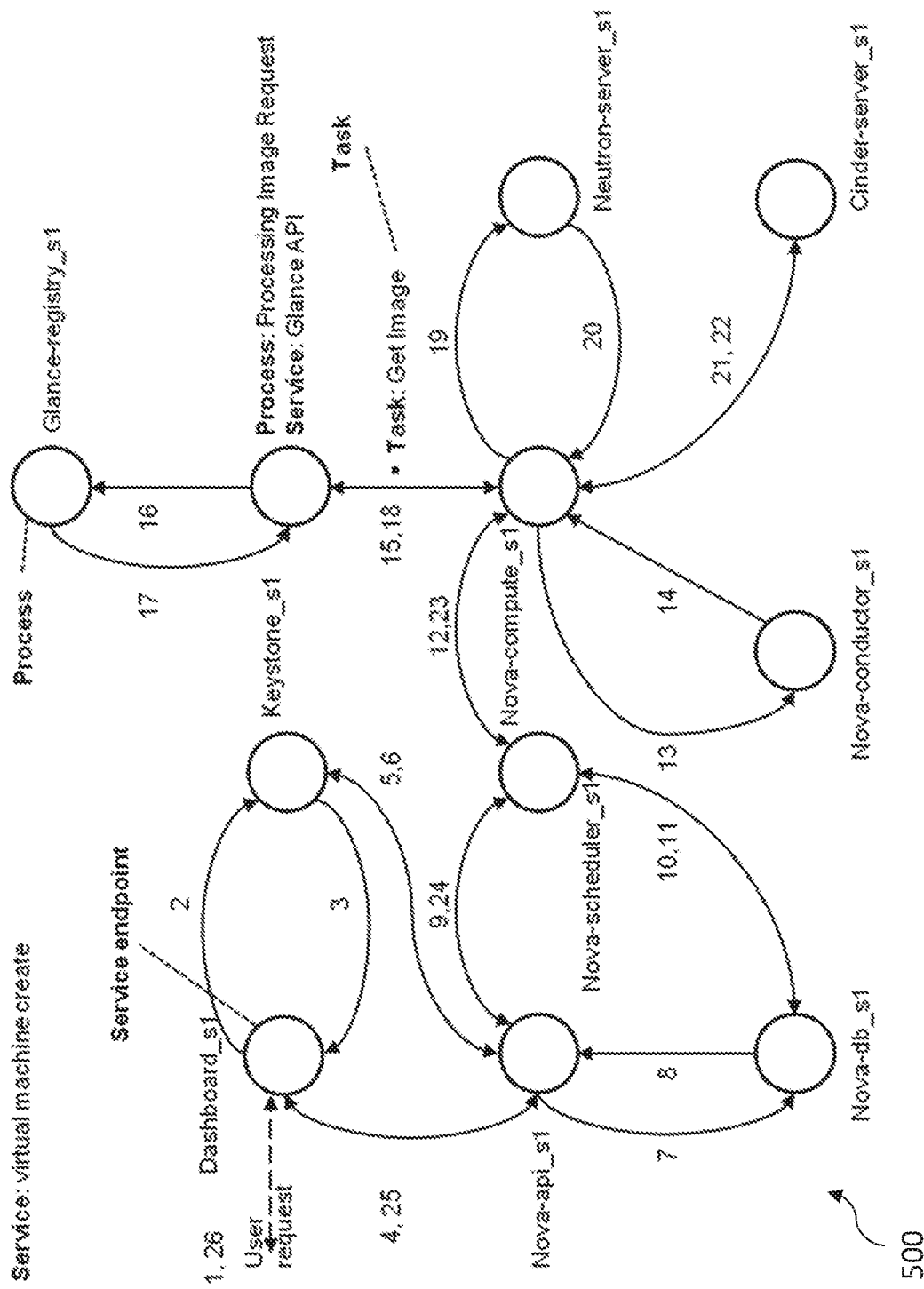
FIG. 5 is a schematic graph of the DESM modelling the provisioning of a "virtual machine create" service.

FIG. 5 is a schematic graph of the DESM modelling the provisioning of Openstack's "virtual machine create" service. In particular, the DESM is modeled as an extension of HFSM. Formally, a DESM is a multi-tuple ($\Sigma$, S, T, s, A, M, L, F), where: ($\Sigma$) is a set of tasks. Tasks represent one or more programming statements (e.g., in Python or C++) which when executed cause a change from one state to another state in service provisioning. The names given to tasks are often verbs, e.g., 'Get Authentication Token'. (S) is the set of states representing specific milestones during the execution of distributed systems which are relevant for service provisioning. States are often identified with verbs ending with "ing", e.g., 'Authenticating User' or verbs in past tense, e.g., 'Token Acquired'. (ss, se$\in$S) ss is the start state and it is always a service endpoint. se is the end state and it is always a service endpoint. Moreover, ss=se. For example, Openstack uses uniform resource locator (URL) endpoints where services can be accessed by end users with the help of client applications; (T:sc$\times\Sigma\rightarrow$sn) is a transition function (t$\in$T) which based on the current state (sc$\in$S) of service provisioning and a set of tasks executed $\Sigma$, computes the next state (sn$\in$S) of provisioning; (A$\subseteq$S) is the accept state and it is always state se. (M:ssub$\rightarrow$ssup) is a mapping function that assigns (groups) the states ssub$\in$S and transitions tsub$\in$T into the superstates ssup$\in$S. Superstates are special states called processes. (L:s$\rightarrow$(st, sl)) is a mapping function that assigns to a state s a state type st$\in$\{sequence, split, join\} and a state logic sl$\in$\{xor, or, and\}. L characterizes the flow of service provisioning. A state can be a sequence, a split, or a join. A 'sequence' state enables its outgoing and incoming transitions in sequence. It represents a sequential flow. A 'split' is a control state that splits a flow into multiple concurrent transitions. It has multiple outgoing transitions. A 'join' is a control state that synchronizes multiple incoming transitions. The 'exclusive or', the 'or', and the 'and' indicate how many of the transitions need to be able to trigged one or more transitions as a group. (F:t$\rightarrow$N) is a mapping function that assigns to each transition t∈T a positive natural number to indicate the execution flow of transitions. The outgoing transitions of split states and incoming transition of join states are assigned the same flow number to express that they are executed in parallel or only a non-empty subset of the transitions will be executed. Flow numbers have a scope between processes and within each process.

In FIG. 5, the eleven states shown identify important milestones reached during service provisioning. Each transition represents a set of programming statements that is executed to make the DESM change from one state to another state. Each transition has a flow number to indicate when it is activated. The distributed execution state machine is described as follows.

The end user submits a request to create a new virtual machine (1). For this request, the start state of the DESM is Dashboard_sl. The Dashboard service contacts the Keystone service to generate an authenticated token (2). The new state of the distributed system is Keystone_sl. The Keystone service sends a token back to the Dashboard (3). The state is again Dashboard_sl. The Dashboard sends a request to Nova API service to create a virtual machine (4). The new state is Nova-api_sl. The Nova API service sends the token for validation to the Keystone service. The new state is Keystone_sl (5). The Nova API service receives validation information (6). The new state is Nova-api_sl (if the token is not valid, the user is informed that the request has been rejected). The Nova API service makes a database entry for the new virtual machine (7). The new state is Nova-db_sl. The database returns a code of the database access (8). The new state is Nova-api_sl. The Nova API service sends the request to the Nova Scheduler service (9). The new state is Nova-scheduler_sl. The Nova Scheduler service interacts with Nova-db_sl to decide on which host to run the new server (10, 11). The new state is Nova-scheduler_sl. The Nova Scheduler service sends the virtual machine create request to the elected Nova Compute service host via rpc.call (12). The new state is Nova-compute_sl. Further steps (13-18). Once the image is ready, the Nova Compute service requests a new IP (19-20). Further steps (21-25). The user receives a reference of the virtual machine created (26).

To simplify the DESM, only the task 'Get Image' was shown for transition (15). Also, for simplicity, no detail process was shown.

Figure 6:
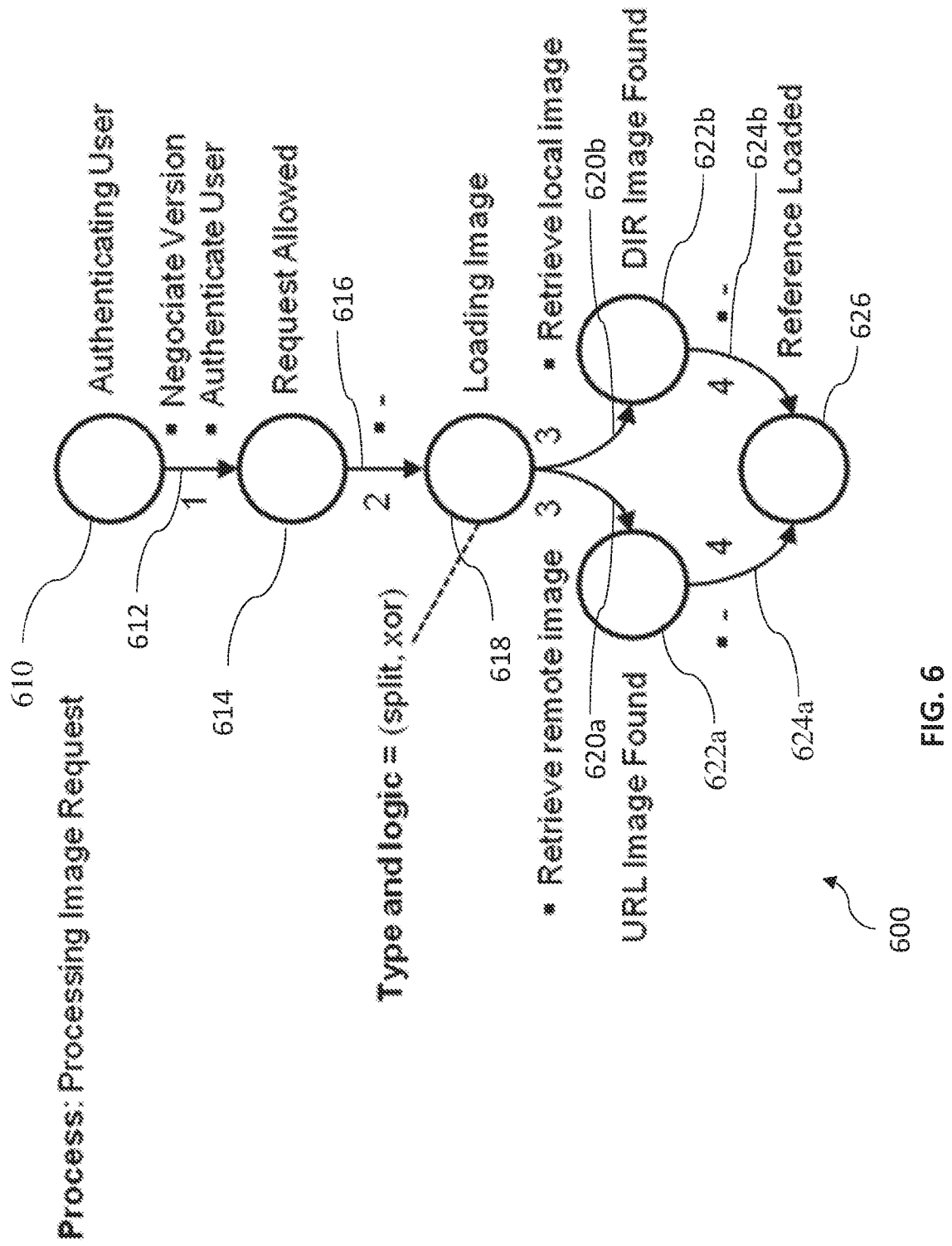
FIG. 6 is a schematic graph of a process associated with a superstate.

FIG. 6 is a schematic graph of a process associated with the superstate Glance-api_sl. A first node 610 relates to authenticating a user. This state transitions in transition 612 of negotiating the version and authenticating the user to state 614, where the request has been allowed. Subsequently, it transitions 616 to the node 618 of loading an image. If a remote image should be retrieved, the transition 620a is towards the node 622a, which corresponds to the "URL image found" state. Alternatively, if a local image should be retrieved, the transition 620b is towards node 622b, which corresponds to a DIR image being found. The next transitions 624a, 624b are towards the node 626 corresponding to a "Reference Loaded" state.

To externalize and make the traces of DESMs transparent, developers can use instrumentation to add code instructions to record the states and processes reached and the tasks executed. This step is called Instrument Software Code and it is executed by the Instrumentation subsystem 336.

At first sight existing approaches such as code tracing, debugging, and logging could provide a suitable solution for tracing service provisioning. Nonetheless, a closer scrutiny makes clear that existing approaches only provide generic functions, such as 'Write(string)', 'WriteIf(string)', 'Assert', 'log.info(string)', 'log.warning(string)', and 'log.error (string)' to record text messages about: invoked functions; data payloads; callback routines; data persistence to DBs; and error conditions and exceptions.

These primitives record information in the logs but overlook the semantics associated with state-centric service provisioning. As a result, the reconstruction of traces is based on timing information, variable correlation, heuristics, and assumptions, which do not fully capture what really happened during provisioning due to asynchronous behaviors, concurrency, and caching effects, to name a few.

It is possible to go one step further using DESM semantics for instrumentation: start and end of service provisioning; entry and exit of processes; entry and exit of states; execution of tasks belonging to processes; decisions affecting the control flow of processes; correlation between different processes; concurrent execution of processes; and synchronization of processes.

Listing 1 provides a set of functions to illustrate the level of semantics introduced:

---
Listing 1. Set of functions illustrating the use
of DESM-based semantics for instrumentation.

```
ctx = create_context(request_id, user_id, ...)
ctx = get_context(...)
start_service_tracing(ctx, service_name, ...)
end_service_tracing(ctx, service_name, ...)
enter_process_tracing(ctx, process_name, ...)
exit_process_tracing(ctx, process_name, ...)
enter_state_tracing(ctx, state_name, ...)
exit_state_tracing(ctx, state_name, ...)
xor_split_state_tracing(ctx, state_name, ...)
or_split_state_tracing(ctx, state_name, ...)
and_split_state_tracing(ctx, state_name, ...)
xor_join_state_tracing(ctx, state_name, ...)
or_join_state_tracing(ctx, state_name, ...)
and_join_state_tracing(ctx, state_name, ...)
horizontal_process_correlation(ctx_from, ctx_to, ...)
```
---

These functions are part of the Instrumentation Library (e.g., an API). When an instrumentation function is called it generates an event, which is sent to the Service Tracing subsystem. Events are represented using an Independent Tracing Language.

The Instrumentation Library should be sufficiently rich to enable DESM traces to be preserved for later reconstruction. Elements to be preserved include concurrent behaviors, forks, and joins. These elements allow diagnosing problems related to excessive or insufficient parallelism, diagnosing excessive waiting at synchronization points, and identifying critical paths.

Trace End-to-End Service Provisioning (Step 3 of FIG. 4) is the activity of tracing a service request and its service provisioning. During provisioning, the instrumentation subsystem emits events to indicate that the DESM is moving through a series of states of S in response to the execution of programming statements from $\Sigma$. The statements executed by the distributed system trigger transitions (t∈T and T:sc× $\Sigma \rightarrow$ sn), which make the DESM move from state sc to state sn. The sequence of states $\{(s_i, s_j), (s_j, s_k), \ldots, (s_m, s_n)\}$, $\{s_i, \ldots, s_n\} \in S$ is called a distributed execution trace or simply a trace.

An Independent Tracing Language (ITL) makes tracing information portable to, e.g., visualization and analytical tools. This intermediate representation language provides an integration layer between software code behavior and service provisioning.

There is a clear mapping between the functions of the Instrumentation Library described in the previous section and the events of the intermediate tracing language. When invoked, each function of the Instrumentation Library emits a specific event, which is for the Distributed Execution Trace Reconstruction subsystem to later reconstruct state machines and traces.

The following extract illustrates such an intermediate tracing language that would be generated when the partial DESM from FIG. 6 is executed. It shows examples of trace events to indicate the beginning of service provisioning, when the system enters or exit processes, when tasks are executed, and when states are reached. The tracing language must capture all the information needed to later reconstruct a DESM.

Listing 2. Extract of an end-to-end service provisioning trace represented with the Independent Tracing Language.

SERVICE_ID4 SERVICE "Virtual Machine Create" START USER_ID CTX
...
SERVICE_ID4 PROCESS_CORR (SERVICE_ID4, PROCESS_ID7) CTX
PROCESS_ID7 PROCESS "Processing Image Request" ENTER CTX
CTX.SERVICE='Glance API'
PROCESS_ID7 STATE "Authenticating User" ENTER CTX
PROCESS_ID7 TASK "Negotiate Version" CTX
CTX.FUNCNAME='brk.version_negotiation'
PROCESS_ID7 TASK "Authenticate User" CTX
CTX.FUNCNAME='keystoneclient.session'
PROCESS_ID7 STATE "Request Allowed" EXIT CTX
PROCESS_ID7 STATE "Loading Image" ENTER XOR.SPLIT CTX
PROCESS_ID7 TASK "Retrieve remote image" CTX
CTX.FUNCNAME='get_rmt_img'
PROCESS_ID7 STATE "URL Image Found" EXIT XOR.JOIN CTX
...
PROCESS_ID7 PROCESS "Processing Image Request" EXIT CTX
SERVICE_ID4 SERVICE "Create VM" END CTX Each line enables to trace which states and processes were reached and which tasks were executed. Service requests and processes have a Universally Unique identifier (UUID)—a 128 bit number. These identifiers are accessible from all areas of the server that receives the initial request or servers that contribute to service provisioning by handling parts of the request. If threads handle requests one at a time, storing a UUID in thread-local storage is a simple and efficient solution. In the previous ITL extract, SERVICE_ID4 and PROCESS_ID7 are examples of UUIDs. These identifiers are used to stitch together the events that are related to the same service request and to the same service provisioning.

When service provisioning transfers the execution from one server to another server, a new unique identifier is generated by the server that receives the execution and a new process state starts. The instruction PROCESS_CORR (PROCESS_IDX, PROCESS_IDY) enables establishing a logical dependency and correlation between identifiers associated with processes (superstates). Generating a new UUID when a server receives the control flow is fundamental to enable the tracing of parallel executions (generated by states with a xor or splits type/logic). The first process started by a service request is also correlated using PROCESS_CORR ( . . . ). It establishes a correlation between a service and a process. The previous ITL sample shows the following service/process correlation: SERVICE_ID4 PROCESS_CORR (SERVICE_ID4, PROCESS_ID7) CTX.

Context metadata (represented with CTX in the ITL extract) includes several pieces of information typically present in tracing frameworks. An example of a context metadata schema is given as: CTX=TIMESTAMP MSG COMPONENT FUNCNAME FILENAME LINENO.

The ITL should be designed with the ability to propagate context metadata with the flow of execution. Context metadata can be seen as a data structure to aggregate contextual information about the flow of execution such as debug messages (MSG), timestamps (TIMESTAMP), components or modules (COMPONENT), system metrics (CPU, MEM), method names (FUNCNAME), file names (FILENAME), and line number (LINENO) where processing is occurring.

Timestamps characterize temporally when an instrumentation event was generated. Timestamps can be used to provide reasons about when the instrumentation events were generated within a same server since they can be used to define a total order. Across servers, the correlation primitive can be used to define a logical order between processes.

Events arriving from the Instrumentation Library and formatted according to the ITL are stored in a fast transportation medium (such as a message queue) and wait to be processed. Using stream processing technologies, events are analyzed and dispatched to the Service Tracking, Process Tracking, and Task Tracking for indexing and analysis.

Since the various events expressed by the ITL include context metadata with a timestamp, it is possible to discover the causality between trace events. Each event records the fact that a particular state in provisioning was reached at a particular time. Step 4 establishes the causality between events to identify the progress of service provisioning over time. This step is called Reconstruct Trace and it is executed by the Trace Reconstruction subsystem (Distributed Execution (DE) Trace Reconstruction module).

To reconstruct end-to-end service provisioning, four main procedures need to be executed: 1) associate tasks with processes; 2) associate processes with services; 3) correlate processes; and 4) reconstruct end-to-end traces.

1) Associating Tasks with Processes

When a server receives a request from another server, it creates a new process state PROCESS with identifier PROCESS_ID (a UUID) and a name PNAME. All states STATE and tasks TASK generated by the server in response to the same request receive this identifier PROCESS_ID. Thus, all states and tasks generated to handle the request have the same PROCESS_ID. This enables easily associating them to their parent process.

Figure 7:
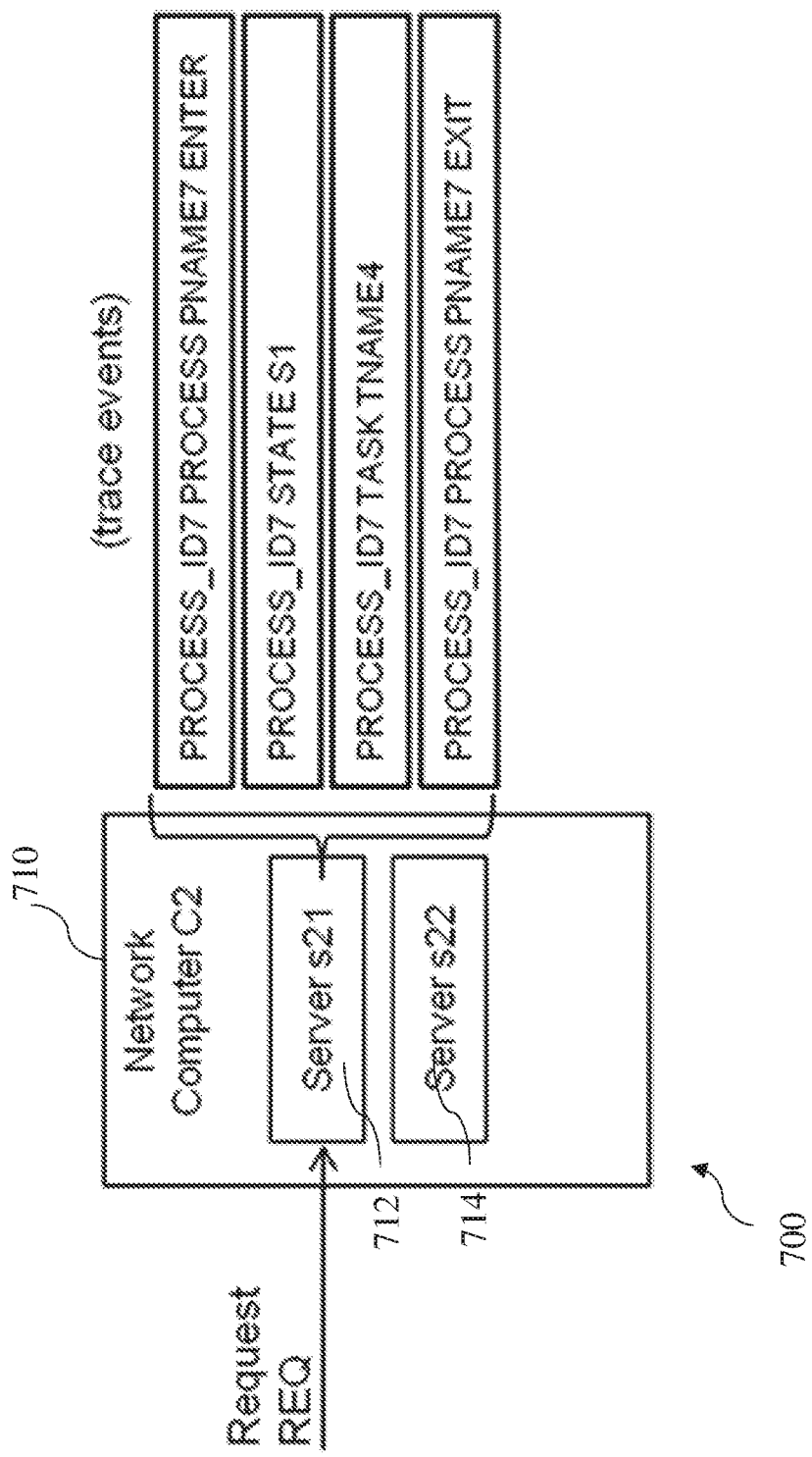
FIG. 7 is a schematic diagram that illustrates associating states and tasks with processes.

The method is illustrated in FIG. 7. A network computer 710 comprises a first and second server 712, 714. The first server 712 receives a request (REQ) from another server (not shown in FIG. 7). The first server creates a new state identified with PROCESS_ID7 and names the process PNAME7. To indicate the starting of the process, the event has the tag ENTER: PROCESS_ID7 PROCESS PNAME7 ENTER.

After tracing all the states and tasks, which were executed to handle request REQ, the completion of tracing the process is marked by emitting the event EXIT: PROCESS_ID7 PROCESS PNAME7 EXIT.

States and tasks specify the process they belong to and their name. Each state and task can also include its own identifier to enable a posteriori fine-grained analysis of provisioning.

FIG. 7 is a schematic diagram that illustrates associating states and tasks with processes.

2) Associating Processes with Services

When users make service requests, service-provisioning tracing is initiated using the following procedure. The server provisioning a service requested by a user generates an event SERVICE with identifier SERVICE_ID and a PROCESS_ID to identify the process to be started. The server associates the SERVICE_ID with PROCESS_ID using the event PROCESS_CORR(SERVICE_ID, PROCESS_ID). The procedure is illustrated in FIG. 8.

FIG. 7 is a further schematic diagram that illustrates associating processes with services. The Server s11 running on Network Computer C1 receives a service request S_REQ. Server s11 generates a new identifier SERVICE_ID4 and starts tracing the service request by emitting the event (1), where SNAME1 is the name of the service started: SERVICE_ID4 SERVICE SNAME1 START.

When another server is required to participate in provisioning, the correlation event (2) is emitted and establishes an association between SERVICE_ID4 and PROCESS_ID7; SERVICE_ID4 PROCESS_CORR(SERVICE_ID4, PROCESS_ID7).

Figure 8:
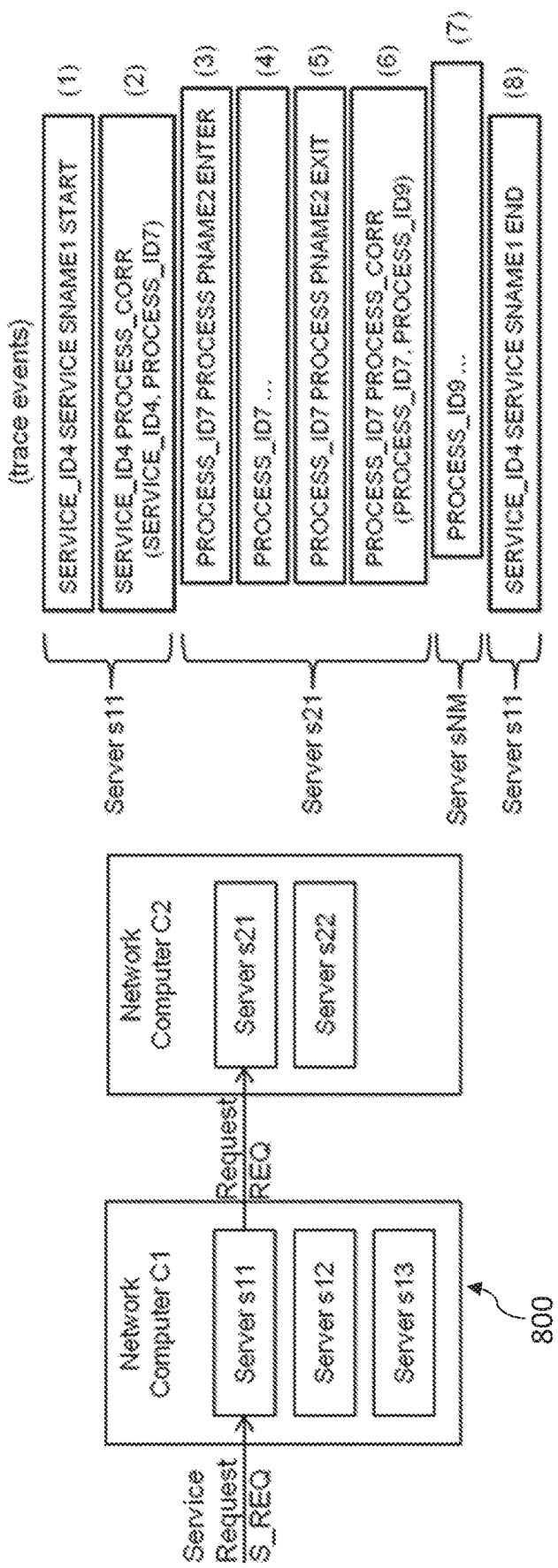
FIG. 8 is a schematic diagram that illustrates associating processes with services.

In FIG. 8, Server s21 will continue the processing and apply the procedure 'associating tasks with processes'. The previous procedure will emit events (3)-(5). Depending on the implementation, the correlation events can be emitted by the caller or by the callee.

When service provisioning is completed, event (8) is emitted: SERVICE_ID4 SERVICE SNAME1 END.

3) Correlating Processes with Processes

The tracing of service provisioning is transferred from one server to another if a server calls another server. In other words, when a server from a network computer requests a service from another server of another network computer, a process correlation event is generated: PROCESS_CORR (PROCESS_ID1, PROCESS_ID2).

PROCESS_ID1 is the identifier of the caller and PROCESS_ID2 is the identifier of the callee. The call to another process involves passing context metadata between components.

The procedure is illustrated in FIG. 8. When the control flow is transferred from Server s11 to Server s21, a correlation is established and event (6) is emitted. Server s21 will continue the processing and apply the procedure 'associating tasks with processes'. The procedure will emit event (7) (other events possibly generated are not illustrated).

4) Reconstruct Process Model Traces

At this stage, processes have been associated with services, processes correlated with services and processes, and tasks associated with processes. Thus, it is possible to reconstruct a full DESM-based end-to-end provisioning trace. The following procedure describes the reconstruction.

Inputs: SERVICE_ID: The identifier of the service request to reconstruct; CORRELATIONS: The set of the process correlations PROCESS_CORR (X_ID, Y_ID) to consider; and ALL_EVENTS: The set of the events to consider.

Output: A distributed execution trace.

Procedure: Calculate the Transitive Closure (TC) of SERVICE_ID using the correlation set CORRELATIONS, TC(SERVICE_ID, CORRELATIONS). For each event with identifier ID in TC(SERVICE_ID, CORRELATIONS), create a new list ID_LIST with the events in ALL_EVENTS with the identifier ID. Sort the ID_LIST using the timestamp TIMESTAMP from the CTX context. Establish a link between two sets ID_LIST1 and ID_LIST2 if a process correlation PROCESS_CORR(PROCESS_ID1, PROCESS_ID2) exists in CORRELATIONS. Establish a link between SERVICE_ID and set SET_LIST using the process correlation PROCESS_CORR (SERVICE_ID, PROCESS_ID1).

Procedure 1. Distributed Execution Trace Reconstruction Procedure

Since events are ordered using timestamps, it is necessary to account for synchronization differences between network computers. Networked computers are not expected to have fully synchronized clocks. On the same computer, trace events are ordered using local timestamp since the physical clock is the same. On different networked computers, two process traces are ordered using correlation events PROCESS_CORR (PROCESS_ID1, PROCESS_ID2) to explicitly state that the start of process PROCESS_ID1 happened before PROCESS_ID2. This may require the use of logical clocks.

The reconstructed traces are stored in the Trace Repository to be analyzed and visualized. Operations and development teams are often functionally disconnected. A unified environment can bridge the gap between operations and development teams by bringing them together to diagnose problems that may occur during service provisioning. To support DevOps practices, there can be provided a linkage between DESM and distributed execution traces, which are suitable for operation teams, and traditional logging infrastructures which are suitable for developers. Step 5 is called Link Trace with Log Records and is executed by the DESM/Log Linkage module of the Trace Reconstruction subsystem. This integration is archived using the intermediate Tracing Language as illustrated in FIG. 9.

Figure 9:
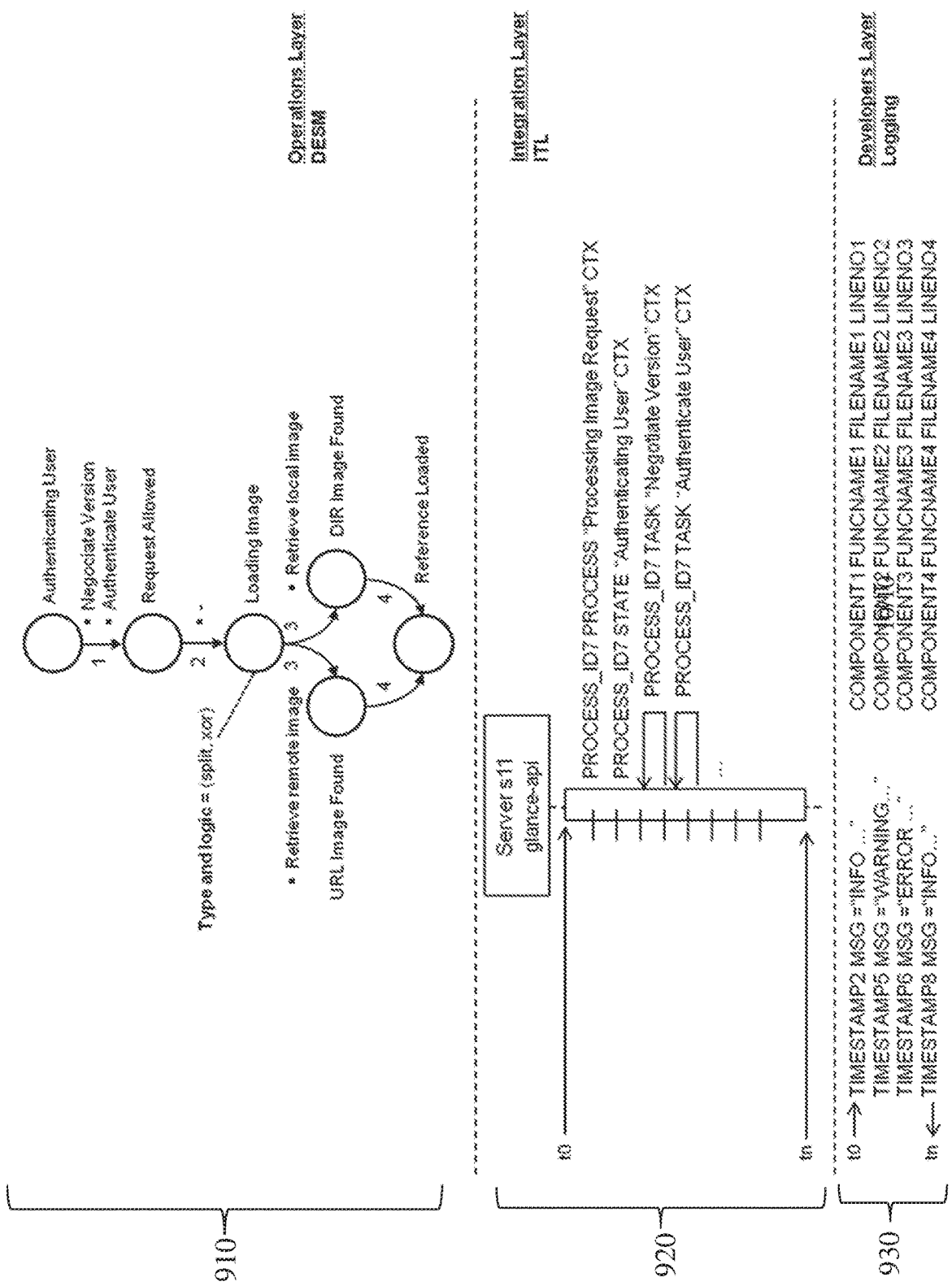
FIG. 9 is a schematic diagram that illustrates linking of a DESM with logging using the ITL.

FIG. 9 is a schematic diagram that illustrates linking of a DESM with logging using the ITL.

An operations layer 910 captures the service provisioning using DESMs as described above. A developers' layer 930 captures detailed system execution information, typically recorded by logging infrastructures. An integration layer 920 brings these two layers together by linking them using the ITL.

The intermediate tracing language is used, not only to provide a view on provisioning to operators, but also to integrate the high-level DESM-based tracing to the low-level records stored in logging systems. When an operations team identifies a failure, development teams can easily access low-level, detailed information about the individual software components that failed. This enables a faster localization of service provisioning failures. This may be extremely important since software fault localization is one of the most expensive activities in systems' operations and maintenance. Since the intermediate tracing language uses timestamps, they can be used to make association with the records from traditional log records.

The automated linkage is achieved using the following procedure. Inputs: TE: A trace event with timestamp CTX.TIMESTAMP, e.g., PROCESS_ID TASK "name" . . . CTX.TIMESTAMP; W: A window with the structure W(tm, tp), where tm and tp are lower bound and upper bound of the window, respectively; And LR: A log record LR with timestamp TIMESTAMP. Output: A link between a distributed trace event and a log record. Procedure: Establish a link between LR and TE iff: CTX.TIMESTAMP−tm<TIMESTAMP<CTX.TIMESTAMP+tp.

The linking is based on the point in time when events occurred. Several log records LR can be associated with a trace event TE. The number of associations can be managed by controlling the size of the window.

Good analysis and visualization are important for failure management. Many types of diagrams can be used to analyze and visualize end-to-end provisioning traces. Step 6 is called Analyze and Visualize Provisioning and it is executed by the Trace Analysis and Visualization subsystem (Visualization of Distributed Execution Trace module). The analysis of traces can be done using a simple procedure that evaluates if a distributed execution trace is a valid instance of the distributed execution state machine underlying the service provisioning that generated it. This section explains how sequence diagrams can be generated from a trace.

Figure 10:
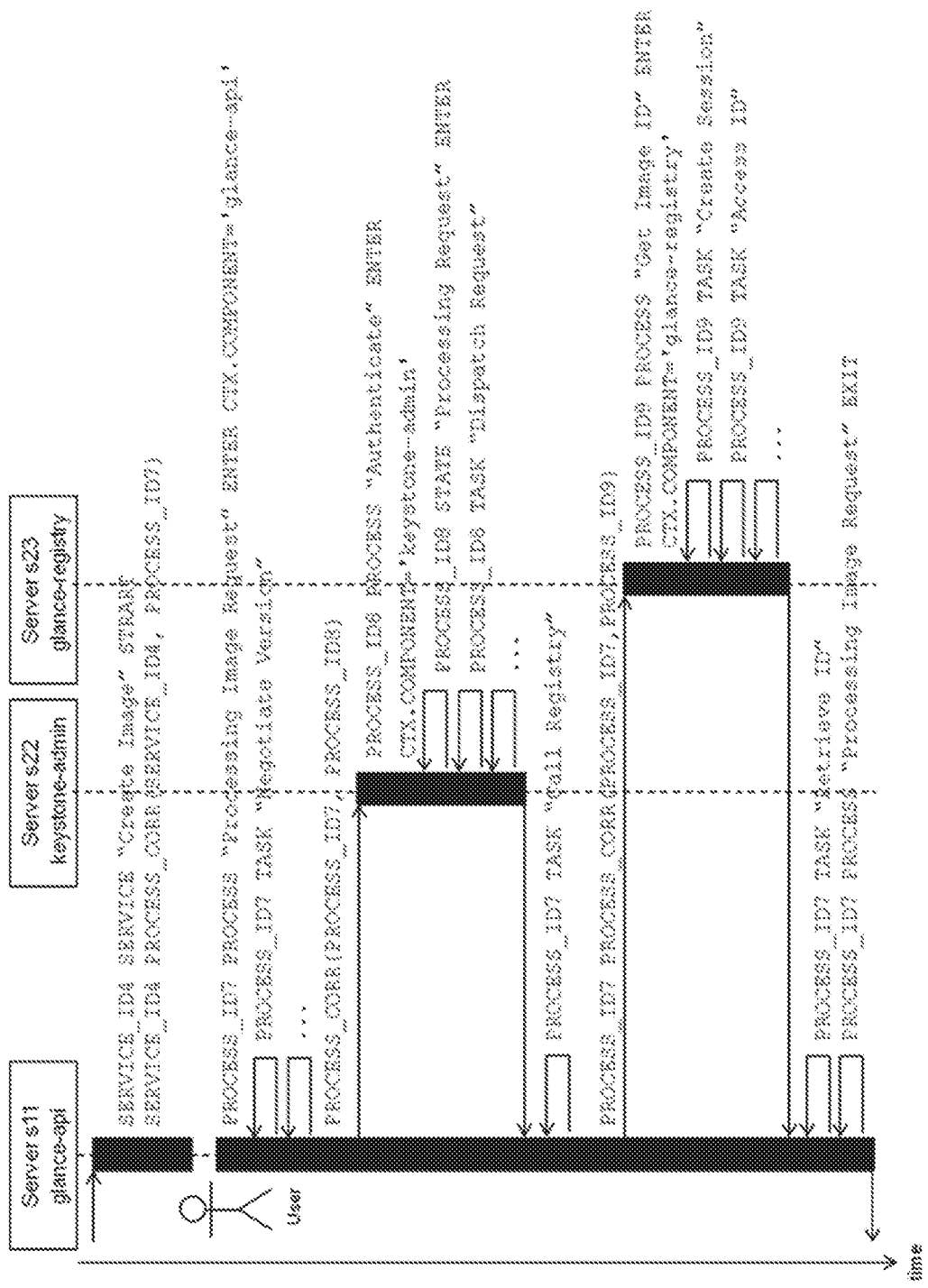
FIG. 10 is a sequence diagram generated from a distributed execution trace.

Sequence diagrams are often used to express the logical flow of complex services and operations, and can be used to effectively visualize service provisioning. FIG. 10 shows an example of a sequence diagram created from a trace. The diagram shows three of the servers involved in service provisioning: Server s11 "glance-api", server s22 "keystone-admin", and server s23 "glance-registry". The SERVICE_ID4 indicates the entry point of the service request. Services, processes, states, and tasks were associated with their lifelines. Each activation box corresponds to a different process with a unique PROCESS_ID. All tasks executed and states reached in the context of a process are placed in processes' lifelines. The vertical progression indicates the logical (and physical) ordering of the execution of tasks.

Visualization as shown in FIG. 10 enables a detailed analysis of service provisioning. Furthermore, since the ITL is linked to log information, is it possible to "travel" from the sequence diagram to the log records associated in Step 5.

A high level procedure to construct a sequence diagram from a trace is indicated in the following. Inputs: PBT: The trace reconstructed for a SERVICE_ID. Output: A sequence diagram. Procedure: For each distinct CTX.COMPONENT of process PROCESS_ID in PBT, create a participant PARTICIPANT (object). Each component has a lifeline drawn as a box with a dashed line descending from the centre of the bottom edge, representing the life span of the component during the service provisioning. Place in the lifeline of each PARTICIPANT all events associated with the process that generated the participant. For all events in the same ID_LIST, create a timed cycle message (method call) from PARTICIPANT to PARTICIPANT. This enables that events belonging to the same PROCESS_ID are grouped together under the same lifelines and activation boxes. These method-invocation boxes are used to indicate the processing being performed by a component to support service provisioning. For all correlation events PROCESS_CORR (PROCESS_ID1, PROCESS_ID2), create a directed message from the COMPONENT1 generated by PROCESS_ID1 to COMPONENT2 generated by PROCESS_ID2. Messages are indicated on sequence diagrams as labeled arrows. These horizontal arrows express the sequential nature of the logic associated with service provisioning is shown via the ordering of the messages.

These steps are to be used as guidelines since the creation of sequence diagrams depended on the tool which used to visualize diagrams.

Failure management in complex and critical distributed systems, such as large-scale cloud platforms, relies upon the involvement and integration of both operations teams and development teams. Embodiments of the present disclosure can achieve one or more of the following benefits.

Operations as State Machines. For operations teams, the use of an extension of a hierarchical finite state machine to capture the execution flows triggered by service provisioning in complex, large-scale distributed systems enables a more effective management of service failures.

Integrating Operations and Development. Linking operations' processes with software code, and with log records enables to effectively localize failures during service provisioning and more efficiently carry out root cause analysis. This explicit linkage enables to go from service provisioning, to detailed software execution, and, finally, to detailed logging information, and vice-versa.

Domain Specific Semantics for Instrumentation. The use of specific semantics to instrument code provides a state view on distributed systems' execution rather than a low-level call trace or message passing view between components.

State Machine Abstraction. A state machine abstraction matches closely operations teams knowledge when compared to traditional logging and debugging systems.

Independent Tracing Language. An independent tracing language enables to generate various views on a same trace derived from a DESM. Sequence diagrams, networks diagrams, business processes, among other popular diagrams, can easily be generated from the same trace.

Performance Analysis. By adding simple, easily removable, well-isolated instrumentation instructions to the code of distributed systems it is possible to quickly enhance the visibility of service provisioning and identify where failures occur.

The foregoing descriptions are only implementation manners of the present disclosure, the scope of the present disclosure is not limited to this. Any variations or replacements can be made through persons skilled in the art without departing from the present disclosure. Therefore, the protection scope of the present disclosure should be subject to the protection scope of the attached claims.

The invention claimed is:

1. A method for managing failures of a service provided by a distributed system, the method comprising:
storing a distributed execution state machine (DESM), wherein states of the DESM correspond to predetermined milestones of the service, and wherein transitions of the DESM correspond to one or more instructions of the service;
recording events of the distributed system in a log store, wherein the events indicate the states of the DESM or the transitions of the DESM;
reconstructing a trace of the DESM from the events recorded in the log store;
linking logging information of the distributed system to states of the trace of the DESM; and
analyzing the trace of the DESM to identify an affected state or a transition of the DESM, wherein the affected state or the transition is linked to a log record indicating a failure of the service.

2. The method of claim 1, wherein recording events comprises writing statements of an independent tracing language (ITL).

3. The method of claim 2, wherein the ITL comprises lines indicating an identifier of a process, a process correlation, or context metadata.

4. The method of claim 3, wherein the context metadata includes a debug message, a timestamp, a component or module identifier, a system metric, a method name, a file name, or a line number where processing is occurring.

5. The method of claim 3, wherein the ITL indicates a starting of the process with a start tag or a stopping of the process with a stop tag.

6. The method of claim 1, wherein the logging information comprises time stamps.

7. The method of claim 6, wherein linking the logging information of the distributed system to the states of the trace is based on the time stamps.

8. The method of claim 1, wherein the log store comprises a message queue.

9. A computer program product comprising computer-executable instructions stored on a non-transitory computer-readable storage medium that, when executed by a processor, carry out a method for managing failures of a service provided by a distributed system, the method comprising:
storing a distributed execution state machine (DESM), wherein states of the DESM correspond to predetermined milestones of the service, and wherein transitions of the DESM correspond to one or more instructions of the service;
recording events of the distributed system in a log store, wherein the events indicate the states of the DESM or the transitions of the DESM;
reconstructing a trace of the DESM from the events recorded in the log store;
linking logging information of the distributed system to states of the trace of the DESM; and
analyzing the trace of the DESM to identify an affected state or a transition of the DESM, wherein the affected state or the transition is linked to a log record indicating a failure of the service.

10. A device for managing failures of a service provided by a distributed system, the device comprising:
a memory storing instructions; and
a processor coupled to the memory and configured to execute the instructions to:
store a distributed execution state machine (DESM), wherein states of the DESM correspond to predetermined milestones of the service, and wherein transitions of the DESM correspond to one or more instructions of the service;
record events of the distributed system in a log store, wherein the events indicate the states of the DESM or the transitions of the DESM;
reconstruct a trace of the DESM from the events recorded in the log store to create a reconstructed trace;
link logging information of the distributed system to states of the trace of the DESM; and
analyze the trace of the DESM to identify an affected state or a transition of the DESM, wherein the affected state or the transition is linked to a log record indicating a failure of the service.

11. The device of claim 10, wherein the events include:
a service provisioning event indicating a start or end of service provisioning;
a process event indicating an entry or an exit of a process;
a state event indicating an entry or an exit of one of the states of the DESM;
a task event indicating an execution of a task belonging to a process;
a control flow event indicating a decision affecting a control flow of a process;
a correlation event indicating a correlation between a first and a second process;
a concurrent execution event indicating a concurrent execution of processes; or
a synchronization indicating a synchronization of processes.

12. The device of claim 10, wherein a start state of the DESM corresponds to a user submitting a request to create a new virtual machine.

13. The device of claim 10, wherein recording the events comprises the processor writing statements of an independent tracing language (ITL), and wherein the ITL comprises lines indicating an identifier of a process, a process correlation, or context metadata.

14. The device of claim 13, wherein the context metadata includes a debug message, a timestamp, a component or module identifier, a system metric, a method name, a file name, or a line number where processing is occurring.

15. The device of claim 13, wherein the ITL indicates a starting of the process with a start tag or a stopping of the process with a stop tag.

16. The device of claim 13, wherein all events generated by a first server of the distributed system in response to a request receive a same identifier, and wherein a correlation statement of the ITL indicates a correlation between a first process of the first server and a second process of a second server when the first server invokes a function of the second server.

17. The device of claim 10, wherein the logging information comprises time stamps, and wherein the processor is further configured to link the logging information of the distributed system to the states of the trace based on the time stamps.

18. The device of claim 10, wherein the log store comprises a message queue.

19. The device of claim 10, wherein the DESM can be described by $(\Sigma, S, T, s, A, M, L, F)$, wherein $\Sigma$ is a set of tasks, wherein a task comprises one or more instructions, wherein S is a set of states of the DESM, wherein $s \in S$ is a start and end-state of the DESM, wherein $T:sc \times \Sigma \to sn$ is a transition function of the DESM, wherein $A \subseteq S$ is a set of accept states, wherein $M:ssub \to ssup$ is a mapping function that assigns states $ssub \in S$ and transitions $tsub \in T$ into super-states $ssup \in S$, wherein $L:s \to (st, sl)$ is a mapping function that assigns to a state s a state type $st \in \{sequence, split, join\}$ and a state logic $sl \in \{xor, or, and\}$, and wherein $F:t \to N$ is a mapping function that assigns to each transition $t \in T$ a natural number to indicate an execution flow of transitions.

20. The device of claim 10, wherein the processor is further configured to generate a graphical representation of the reconstructed trace of the DESM, and wherein the graphical representation includes a tree view.

* * * * *